United States Patent
Ma et al.

(10) Patent No.: US 12,049,172 B2
(45) Date of Patent: Jul. 30, 2024

(54) CAMERA MIRROR SYSTEM DISPLAY FOR COMMERCIAL VEHICLES INCLUDING SYSTEM FOR IDENTIFYING ROAD MARKINGS

(71) Applicant: Stoneridge, Inc., Novi, MI (US)

(72) Inventors: Liang Ma, Rochester, MI (US); Yifan Men, Northville, MI (US); Troy Otis Cooprider, White Lake, MI (US)

(73) Assignee: Stoneridge, Inc., Novi, MI (US)

( * ) Notice: Subject to any disclaimer, the term of this patent is extended or adjusted under 35 U.S.C. 154(b) by 171 days.

(21) Appl. No.: 17/504,648

(22) Filed: Oct. 19, 2021

(65) Prior Publication Data

US 2023/0117719 A1 Apr. 20, 2023

(51) Int. Cl.
*B60R 1/12* (2006.01)
*G06T 7/13* (2017.01)
(Continued)

(52) U.S. Cl.
CPC ............ *B60R 1/12* (2013.01); *G06T 7/13* (2017.01); *G06T 7/73* (2017.01); *G06V 10/22* (2022.01); *G06V 10/443* (2022.01); *G06V 10/56* (2022.01); *G06V 20/588* (2022.01); *H04N 23/695* (2023.01); *B60R 2001/1253* (2013.01); *G06T 2207/10024* (2013.01);
(Continued)

(58) Field of Classification Search
None
See application file for complete search history.

(56) References Cited

U.S. PATENT DOCUMENTS

| 10,867,189 B2 | 12/2020 | Yoo et al. |
| 10,997,433 B2 | 5/2021 | Xu et al. |

(Continued)

FOREIGN PATENT DOCUMENTS

| CN | 106682586 A | 5/2017 |
| CN | 106164930 B | 11/2019 |

(Continued)

OTHER PUBLICATIONS

Xing Yang et al: "Dynamic integration and online evaluation of vision-based lane detection algorithms", IET Intelligent Transport Systems, The Institution of Engineering and Technology, Michael Faraday House, Six Hills Way, Stevenage, Herts. SG1 2AY, UK, vol. 13, No. 1, Jan. 1, 2019, pp. 55-62. (Year: 2019).*
Arata Takahashi et al: "Image processing technology for rear view camera (1) : Development of lane detection system", , Jun. 1, 2003 (Jun. 1, 2003) (Year: 2003).*
(Continued)

*Primary Examiner* — James M Anderson, II
(74) *Attorney, Agent, or Firm* — Carlson, Gaskey & Olds, P.C.

(57) ABSTRACT

A process for identifying a road feature in an image includes receiving an image at a controller, identifying a region of interest within the image and converting the region of interest from red-green-blue (RGB) to a single color using the controller. A set edges is detected within the region of interest, and at least one line within the set of edges is identified using the controller. The at least one line is compared with a set of known and expected road marking features, and the set of at least one first line in the at least one line is identified as corresponding to a road feature in response to the at least the first line matching the set of known and expected road marking features.

19 Claims, 5 Drawing Sheets

(51) Int. Cl.
  *G06T 7/73*    (2017.01)
  *G06V 10/22*   (2022.01)
  *G06V 10/44*   (2022.01)
  *G06V 10/56*   (2022.01)
  *G06V 20/56*   (2022.01)
  *H04N 23/695*  (2023.01)

(52) U.S. Cl.
  CPC ........... *G06T 2207/20061* (2013.01); *G06T 2207/30256* (2013.01); *G06T 2207/30264* (2013.01)

(56) References Cited

U.S. PATENT DOCUMENTS

| | | | |
|---|---|---|---|
| 2013/0202155 A1 | 8/2013 | Karanam | |
| 2019/0184900 A1* | 6/2019 | Lang | H04N 23/698 |
| 2019/0384304 A1 | 12/2019 | Towal et al. | |
| 2020/0285913 A1 | 9/2020 | Gavrilovic et al. | |
| 2021/0049389 A1 | 2/2021 | Mangla et al. | |
| 2021/0166052 A1 | 6/2021 | Park et al. | |
| 2021/0245660 A1 | 8/2021 | Lavoie et al. | |
| 2022/0366704 A1* | 11/2022 | Quilliard | G06V 20/588 |

FOREIGN PATENT DOCUMENTS

| | | |
|---|---|---|
| CN | 112519753 A | 3/2021 |
| CN | 110386065 B | 9/2021 |
| EP | 1918853 A2 | 5/2008 |
| WO | 2019202317 A1 | 10/2019 |

OTHER PUBLICATIONS

European Search Report for European Application No. 22197189.8 mailed Mar. 20, 2023.

Xing Yang et al: "Dynamic integration and online evaluation of visionbased lane detection algorithms", IET Intelligent Transport Systems, The Institution of Engineering and Technology, Michael Faraday House, Six Hills Way, Stevenage, Herts. SG1 2AY, UK, vol. 13, No. 1, Jan. 1, 2019 (Jan. 1, 2019), pp. 55-62, XP006081775, ISSN: 1751-956X, DOI: 10.1049/IET-ITS.2018.5256.

Arata Takahashi et al: "Image processing technology for rear view camera (1) : Development of lane detection system", R&D Review of Toyota CRDL vol. 28 No. 2, Jun. 1, 2003 (Jun. 1, 2003), pp. 31-36, XP055434327.

Official Journal Of The European Union: "Regulation No. 46 of the Economic Commission for Europe of the United Nations (UNECE)—Uniform provisions concerning the approval of devices for indirect vision and of motor vehicles with regard to the installation of these devices", Oct. 9, 2014 (Oct. 9, 2014), pp. 24-77, XP93029955.

\* cited by examiner

CAMERA MIRROR SYSTEM DISPLAY FOR COMMERCIAL VEHICLES INCLUDING SYSTEM FOR IDENTIFYING ROAD MARKINGS

TECHNICAL FIELD

This disclosure relates to a camera mirror system (CMS) for use in a commercial truck, and an automatic view panning system for the same.

BACKGROUND

Mirror replacement systems, and camera systems for supplementing mirror views, are utilized in commercial vehicles to enhance the ability of a vehicle operator to see a surrounding environment. Camera mirror systems (CMS) utilize one or more cameras to provide an enhanced field of view to a vehicle operator. In some examples, the mirror replacement systems cover a larger field of view than a conventional mirror, or include views that are not fully obtainable via a conventional mirror.

One feature included within some camera mirror systems is an automated panning feature that automatically, or semi-automatically, pans the camera views in order to maintain a view of the rear end of the trailer. In some implementations identification of a trailer edge is used to monitor parameters and features of the trailer, and the parameters and features are then used to assist in identifying the position of the trailer end.

One difficulty encountered by the existing systems is differentiating between an edge of the trailer, and a visually similar line within the field of view that is presented by a lane line, a parking line, a curb, or any similar linear road feature or marking.

SUMMARY OF THE INVENTION

In one exemplary embodiment a process for identifying a road feature in an image includes receiving an image at a controller, identifying a region of interest within the image and converting the region of interest from red-green-blue (RGB) to a single color using the controller, detecting a set edges within the region of interest, and identifying at least one line within the set of edges using the controller, comparing the at least one line with a set of known and expected road marking features to the identified at least one line, and identifying a set of at least one first line in the at least one line as corresponding to a road feature in response to the at least the first line matching the set of known and expected road marking features.

In another example of the above described process for identifying a road feature in an image identifying the set of known and expected road marking features includes an expected width of at least one of parking lines and lane lines.

Another example of any of the above described processes for identifying a road feature in an image further includes identifying two lines in the set of at least one first line as corresponding to a lane line in response to the two lines being approximately parallel and being consistently spaced apart by between 4.5 inches (11.43 cm) and 6.5 inches (16.51 cm).

In another example of any of the above described processes for identifying a road feature in an image the line spacing is an average of the shortest distances between the two approximately parallel lines.

In another example of any of the above described processes for identifying a road feature in an image identifying the set of lines within the set of edges includes feature extraction via Hough transform.

In another example of any of the above described processes for identifying a road feature in an image identifying the set of lines within the set of edges further includes filtering background noise from an output of the feature extraction.

In another example of any of the above described processes for identifying a road feature in an image the set of known and expected road marking features includes known and expected features of parking lines, lane lines, and curbs.

Another example of any of the above described processes for identifying a road feature in an image further includes identifying a set of at least one second line in the at least one line as corresponding to a trailer feature in response to every line in the set of at least one second line not matching the set of known and expected road marking features.

Another example of any of the above described processes for identifying a road feature in an image further includes digitally removing edges not corresponding to lines in the set of at least one second line to create a filtered edge image, and providing the filtered edge image to a trailer feature detection module of a camera mirror system (CMS).

Another example of any of the above described processes for identifying a road feature in an image further includes identifying a trailer bottom line using the trailer feature detection module and determining a trailer angle at least partially using the position of the trailer bottom line within the region of interest.

Another example of any of the above described processes for identifying a road feature in an image further includes panning a CMS view based at least partially on the determined trailer angle such that a trailer end is maintained with the CMS view.

In another example of any of the above described processes for identifying a road feature in an image identifying at least one line within the set of edges using the controller is performed without using polynomial data fitting.

In another example of any of the above described processes for identifying a road feature in an image converting the region of interest from red-green-blue (RGB) to the single color using the controller comprises one of converting the region of interest to gray scale and extracting a green channel from the region of interest.

In another example of any of the above described processes for identifying a road feature in an image further includes distinguishing between at least two corresponding road features by identifying a color of the at least the first line and comparing the identified color to expected colors of the corresponding road features.

In one exemplary embodiment a camera mirror system for a vehicle includes at least one camera defining a field of view including a view of a ground, a camera-mirror-system (CMS) controller including a processor and a memory storing instructions for causing the controller to perform an image-based detection process for identifying a road feature in the image, the image based detection process including receiving an image from the at least one camera at the controller, identifying a region of interest within the image and converting the region of interest from red-green-blue (RGB) to Gray using the controller, detecting a set edges within the region of interest, and identifying at least one line within the set of edges using the controller, comparing the at least one line with a set of known and expected road marking features to the identified at least one line, and identifying a set of at least one first line in the at least one line as corresponding to a road feature in response to the at least the first line matching the set of known and expected road marking features.

In another example of the above described camera mirror system for a vehicle the at least one camera defines a class II and a class IV view.

In another example of any of the above described camera mirror systems for a vehicle comparing the at least one line with a set of known and expected road marking features includes identifying a set of at least one second line in the at least one line as corresponding to a trailer feature in response to every line in the set of at least one second line not matching the set of known and expected road marking features.

In another example of any of the above described camera mirror systems for a vehicle the controller further includes a trailer feature detection module and wherein the trailer feature detection module is configured to determine a trailer angle at least partially based on a position of the at least one second line in the image.

In another example of any of the above described camera mirror systems for a vehicle the controller is further configured to pan a class II view presented to a vehicle operator based at least in part on the determined trailer angle such that the class II view includes at least a portion of a trailer end.

These and other features of the present invention can be best understood from the following specification and drawings, the following of which is a brief description.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1A:
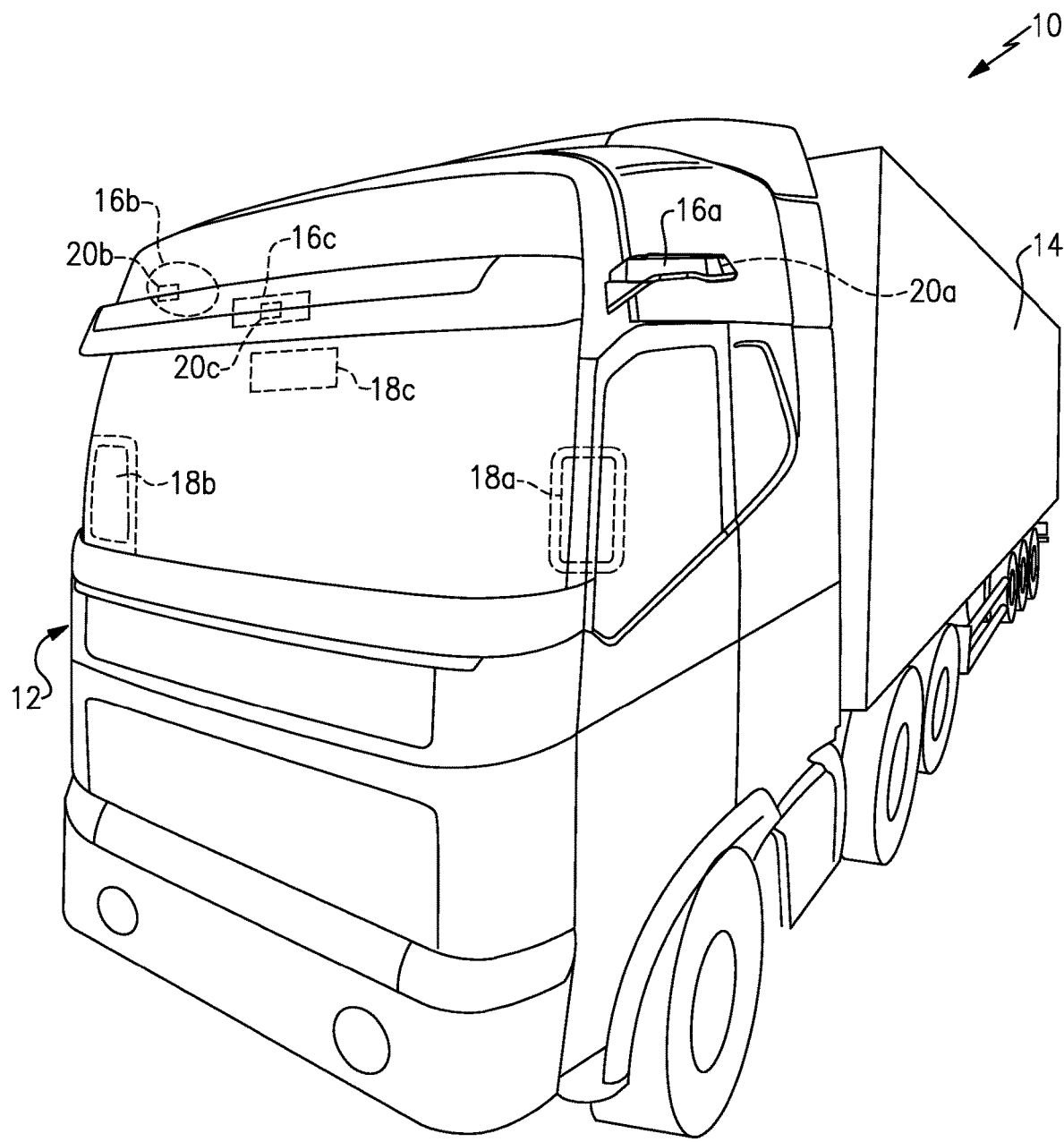
FIG. 1A is a schematic front view of a commercial truck with a camera mirror system (CMS) used to provide at least Class II and Class IV views.
Figure 1B:
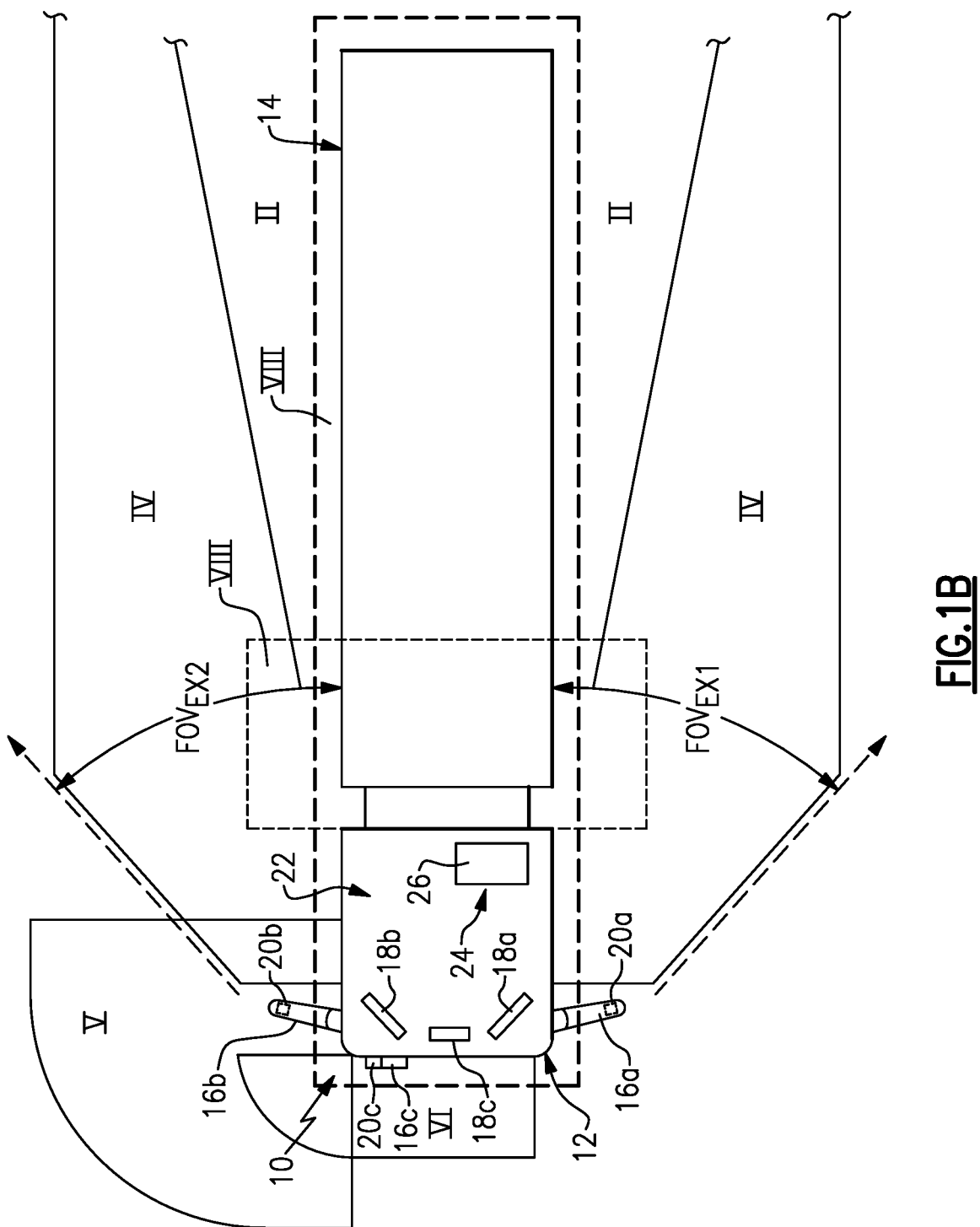
FIG. 1B is a schematic top elevational view of a commercial truck with a camera mirror system providing Class II, Class IV, Class V and Class VI views.
Figure 2:
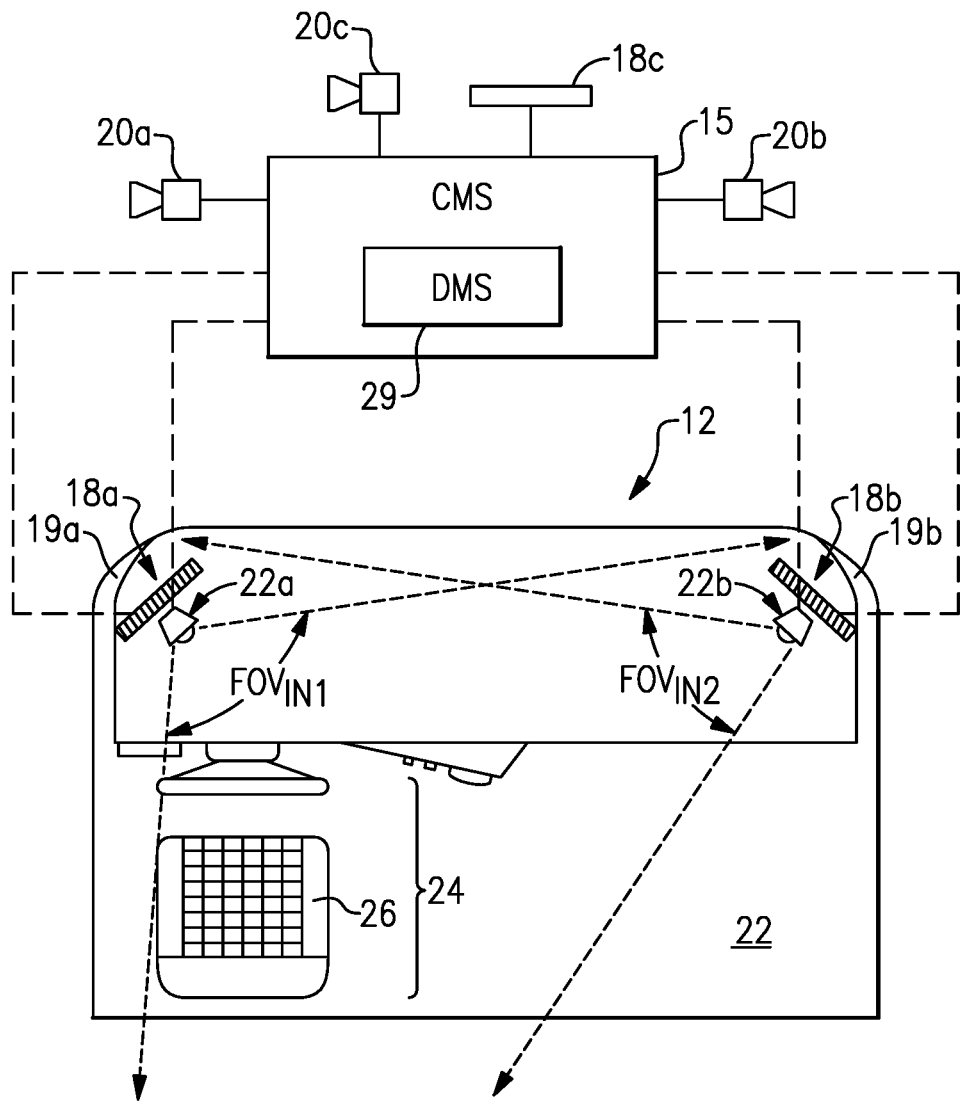
FIG. 2 is a schematic top perspective view of an vehicle cabin including displays and interior cameras.

A schematic view of a commercial vehicle 10 is illustrated in FIGS. 1A and 1B. The vehicle 10 includes a vehicle cab or tractor 12 for pulling a trailer 14. Although a commercial truck is contemplated in this disclosure, the invention may also be applied to other types of vehicles. The vehicle 10 incorporates a camera mirror system (CMS) 15 (FIG. 2) that has driver and passenger side camera arms 16a, 16b mounted to the outside of the vehicle cab 12. If desired, the camera arms 16a, 16b may include conventional mirrors integrated with them as well, although the CMS 15 can be used to entirely replace mirrors. In additional examples, each side can include multiple camera arms, each arm housing one or more cameras and/or mirrors.

Each of the camera arms 16a, 16b includes a base that is secured to, for example, the cab 12. A pivoting arm is supported by the base and may articulate relative thereto. At least one rearward facing camera 20a, 20b is arranged respectively within camera arms. The exterior cameras 20a, 20b respectively provide an exterior field of view $FOV_{EX1}$, $FOV_{EX2}$ that each include at least one of the Class II and Class IV views (FIG. 1B), which are legal prescribed views in the commercial trucking industry. Multiple cameras also may be used in each camera arm 16a, 16b to provide these views, if desired. Each arm 16a, 16b may also provide a housing that encloses electronics that are configured to provide various features of the CMS 15.

First and second video displays 18a, 18b are arranged on each of the driver and passenger sides within the vehicle cab 12 on or near the A-pillars 19a, 19b to display Class II and Class IV views on its respective side of the vehicle 10, which provide rear facing side views along the vehicle 10 that are captured by the exterior cameras 20a, 20b.

If video of Class V and Class VI views are also desired, a camera housing 16c and camera 20c may be arranged at or near the front of the vehicle 10 to provide those views (FIG. 1B). A third display 18c arranged within the cab 12 near the top center of the windshield can be used to display the Class V and Class VI views, which are toward the front of the vehicle 10, to the driver.

If video of class VIII views is desired, camera housings can be disposed at the sides and rear of the vehicle 10 to provide fields of view including some or all of the class VIII zones of the vehicle 10. In such examples, the third display 18c can include one or more frames displaying the class VIII views. Alternatively, additional displays can be added near the first, second and third displays 18a, 18b, 18c and provide a display dedicated to providing a class VIII view. The displays 18a, 18b, 18c face a driver region 24 within the cabin 22 where an operator is seated on a driver seat 26.

In some implementations, the CMS can include an automatic panning feature that pans the Class II view within the Class IV view with the goal of maintaining a trailer end position within the Class II view, and thereby providing enhanced visibility to the vehicle operator. In order to provide this feature, the CMS includes a set of image feature detection algorithms that detects trailer features including the trailer angle using image based analysis of the CMS views. The trailer angle is detected at least partially based on a detected bottom line of the trailer within the Class IV view. Certain road markings, such as parking lines, lane lines, curbs, and the like define long lines within the CMS views that can be difficult to distinguish from trailer edge lines using conventional systems such as polynomial data fitting across an image. Consequently, lane lines, parking lines, curbs and other similar elements positioned within the field of view can result in large angle detection errors when the trailer angle detection inadvertently identifies a road marking or feature as a trailer edge.

Figure 3:
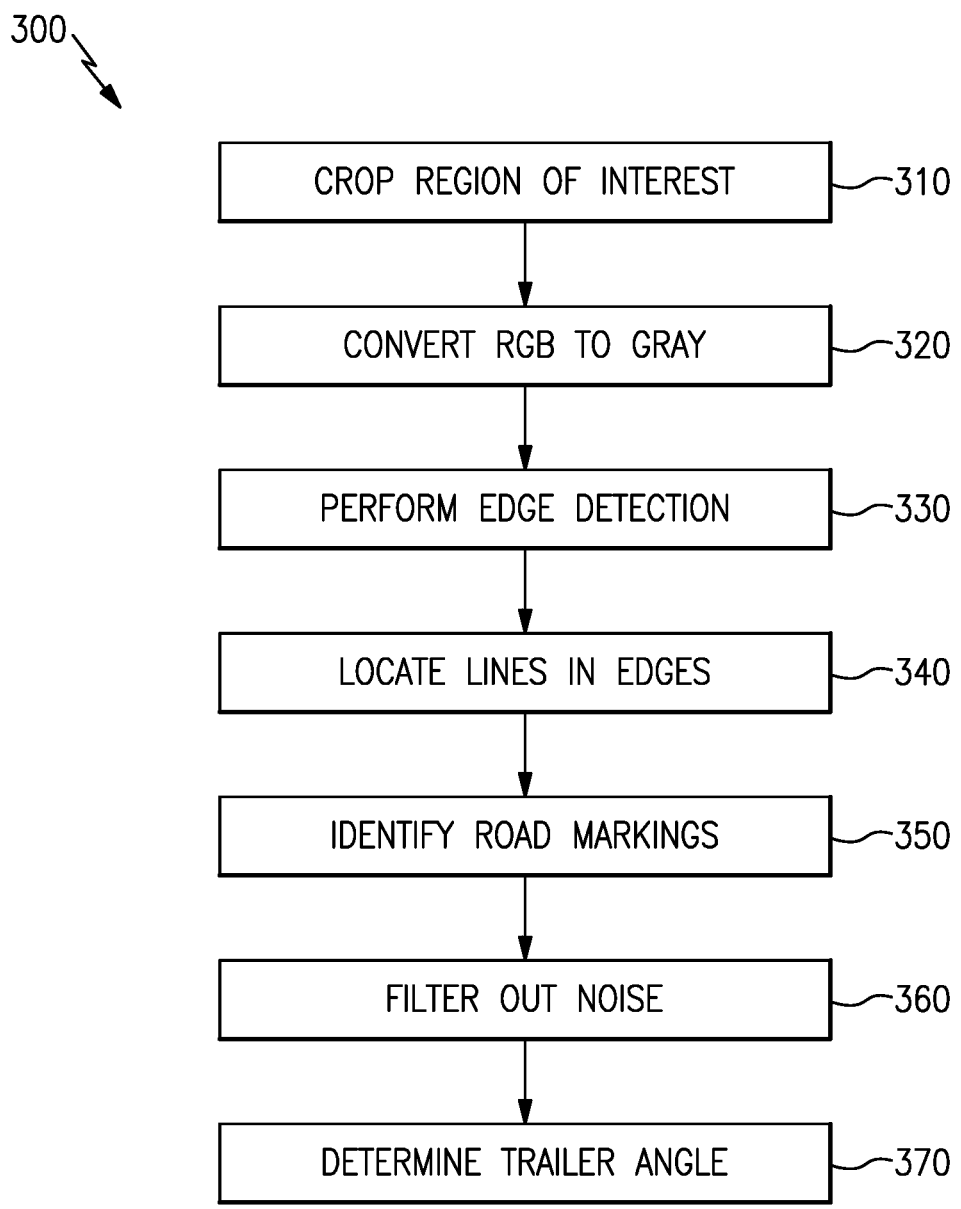
FIG. 3 is a flowchart of a method for identifying road markings.

FIG. 3 illustrates a method operated by the CMS that distinguishes identified lines within an image between a trailer edge line and road markings without using computationally expensive polynomial data fitting. Initially the method identifies a region of interest and crops the remaining portion out of the image in a "Crop Region of Interest" step 310. The region of interest can be identified using any conventional methodology and reduces the image feed to portions including potential edge lines. The region of interest is selected to minimize the analyzed region while keeping desired features in the region of interest. In one example, the region is picked such that the trailer edge is always present in the region of interest for all possible trailer angles. The region is made as small as possible to exclude noise from the image and reduce potential errors induced by noise.

Once cropped, the red-green-blue (RGB) images captured by the CMS camera are converted to grayscale in a "Convert RGB to Gray" step 320. Converting the image(s) to gray increases the contrast at each potential edge further reducing the processing necessary to distinguish edges within the region of interest. In alternative examples, the conversion to Gray step can be omitted and the edge detection process described below can be performed on a single color (e.g. green) that is extracted from the image.

Once cropped and converted to gray, an edge detection algorithm is run on the gray image in a "Perform Edge Detection" step 350. Edge detection algorithms include a variety of mathematical methods that aim at identifying points in a digital image at which the image brightness changes sharply or has discontinuities. The points at which image brightness changes sharply are organized into a set of curved line segments referred to as edges.

Figures 4A, 4B:
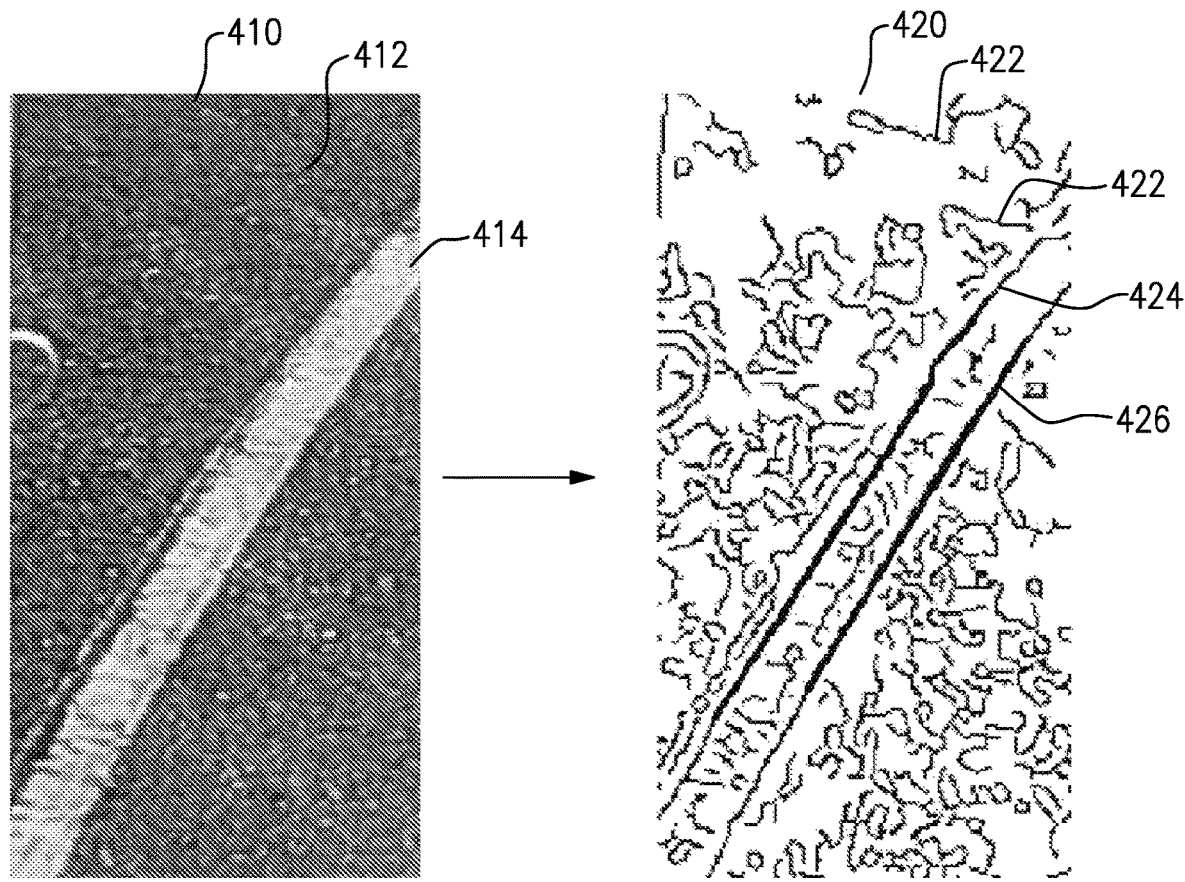
FIG. 4A illustrates a partial CMS view including a road with a lane line.
FIG. 4B illustrates the same partial CMS view after identifying edges within the image.

FIGS. 4A and 4B demonstrate an exemplary conversion from a gray image region 410 (FIG. 4A) to an edge detected image 420 (FIG. 4B). The gray image region 410 includes a road surface 412 including a road marking 414 such as a lane line or a parking line. The road marking is a white stripe, although similar yellow stripes or other colors may occur depending on the geographic region and position on the road surface. In addition to the road marking 414, the road surface includes numerous dents, rocks, rough patches, etc. each which can also result in the presence of one or more edge within the image. After performing the edge detection, the edge image 420 includes numerous edges 422, 424, 426 including the edges 424, 426 of the road marking 414 as well as edges 422 resulting from the various road roughness's.

In order to separate the edges 424, 426 corresponding to the road marking lines and trailer edges from the noise edge detection, the CMS uses a Hough transform to locate lines within the detected edges in a "Locate Lines in Edges" step 340. The Hough transform is a feature extraction technique used in image analysis to find imperfect instances of objects within a certain class of shapes by a voting procedure. This voting procedure is carried out in a parameter space, from which object candidates are obtained as local maxima in a so-called accumulator space that is explicitly constructed by the algorithm for computing the Hough transform. While described herein as using the known Hough transform process to identify lines within the edge image 420, it is appreciated that other methodologies for detecting lines within an edge image, including neural network based line identification, can be used in alternative embodiments with minimal modifications to the overall system.

After identifying each line within the edge image 420, the CMS uses a road marking distinguishing module within the process to determine if the identified lines 424, 426 correspond to road markings in an "Identify Road Markings" step 350. The road marking distinguishing module stores known and expected features of road markings and compares the stored known and expected features to the identified lines. When the known and expected features of the road feature match the lines detected by the CMS, the CMS determines that the lines correspond to the road feature. In one example, road markings (e.g. lane lines and parking lines) will result in two edge lines tracking at least approximately the same trajectory, this can be referred to as the edge lines being approximately parallel. In another example, the road markings are characterized by the presence of two lines separated by a standard distance, or separated by a standard distance range. By way of example, lane lines may be expected to be between 5 inches (12.17 cm) and 6 inches (15.24 cm) wide. In such an example, the distinguishing module looks for two adjacent lines that are between 4.5 inches (11.43 cm) and 6.5 inches (16.51 cm) apart, and identifies any set of edge lines within that range as corresponding to a lane line, with the additional 0.5 inch on each edge of the range being included to account for variabilities that can result due to imperfect lane line printing, parking lines superimposed over pre-existing lane lines, and similar real world variabilities.

Similar ranges can be identified and used for parking lines 3.5 inches (8.89 cm) to 4.5 inches (11.43 cm), curbs 5.5 inches (13.97 cm) to 6.5 inches (16.51 cm), or any other road marking. In alternative examples, the distance between the edge lines 424, 426 can be measured in image pixels instead of a distance. In one such example the range for parking lines and lane lines could be from 16 to 25 pixels.

In another example, the color data of each of the identified road features can be utilized to distinguish types of features (e.g. a yellow line demarking a separation between opposing traffic direction lanes can be differentiated from a white line demarking a separation between aligned traffic direction lanes).

When the distinguishing module determines that the edge lines 424, 426 correspond to road markings, the lines 424, 426 are filtered out along with the noise edges 422 in a "Filter out Noise" step 360. If any lines remain after filtering out the noise, the process assumes that the lines correspond to a trailer line and provides the trailer line position(s) to a trailer feature estimation module within the CMS. The trailer feature estimation module determines whether the remaining line(s) are trailer ends, trailer bottom edges, or other features of the trailer, and computes a line angle in the image plane and world coordinates of the line in a "Determine Trailer Angle" step 370. The line angle is used to determine the trailer angle according to any known trailer angle determination process.

By using the differentiating method described above, the trailer angle determination system avoids reliance on cubic polynomial data fitting for an entire region and allows detection of road features that are perpendicular to or approximately perpendicular to the trailer edge, thereby minimizing an occurrence of erroneous trailer angle detections.

Although an example embodiment has been disclosed, a worker of ordinary skill in this art would recognize that certain modifications would come within the scope of the claims. For that reason, the following claims should be studied to determine their true scope and content.

What is claimed is:

1. A process for identifying a road feature in an image comprising:
   receiving an image at a controller;
   identifying a region of interest within the image and converting the region of interest from red-green-blue (RGB) to a single color using the controller;
   detecting a set of edges within the region of interest, and identifying at least one line within the set of edges using the controller;
   comparing the at least one line with a set of known and expected road marking features, and identifying a set of at least one first line in the at least one line as corresponding to a road feature in response to the at least the first line matching at least one of the set of known and expected road marking features; and identifying a set of at least one second line in the at least one line as corresponding to a trailer feature in response to every line in the set of at least one second line not matching the set of known and expected road marking features.

2. The process of claim 1, wherein identifying the set of known and expected road marking features includes an expected width of at least one of parking lines and lane lines.

3. The process of claim 2, further comprising identifying two lines in the set of at least one first line as corresponding to a lane line in response to the two lines being approximately parallel and being consistently spaced apart by between 4.5 inches (11.43 cm) and 6.5 inches (16.51 cm).

4. The process of claim 3, wherein the line spacing is an average of the shortest distances between the two approximately parallel lines.

5. The process of claim 1, wherein identifying the set of lines within the set of edges includes feature extraction via Hough transform.

6. The process of claim 5, wherein identifying the set of lines within the set of edges further includes filtering background noise from an output of the feature extraction.

7. The process of claim 1, wherein the set of known and expected road marking features includes known and expected features of parking lines, lane lines, and curbs.

8. The process of claim 1, further comprising digitally removing edges not corresponding to lines in the set of at least one second line to create a filtered edge image, and providing the filtered edge image to a trailer feature detection module of a camera minor system (CMS).

9. The process of claim 8, further comprising identifying a trailer bottom line using the trailer feature detection module and determining a trailer angle at least partially using the position of the trailer bottom line within the region of interest.

10. The process of claim 9, further comprising panning a CMS view based at least partially on the determined trailer angle such that a trailer end is maintained with the CMS view.

11. The process of claim 1, wherein identifying at least one line within the set of edges using the controller is performed without using polynomial data fitting.

12. The process of claim 1, wherein converting the region of interest from red-green-blue (RGB) to the single color using the controller comprises one of converting the region of interest to gray scale and extracting a green channel from the region of interest.

13. The process of claim 1, further comprising distinguishing between at least two corresponding road features by identifying a color of the at least the first line and comparing the identified color to expected colors of the corresponding road features.

14. A camera mirror system for a vehicle comprising:
at least one camera defining a field of view including a view of a ground;
a camera-mirror-system (CMS) controller including a processor and a memory storing instructions for causing the controller to perform an image-based detection process for identifying a road feature in the image, the image based detection process including:
receiving an image from the at least one camera at the controller;
identifying a region of interest within the image and converting the region of interest from red-green-blue (RGB) to a single color using the controller;
detecting a set of edges within the region of interest, and identifying at least one line within the set of edges using the controller;
comparing the at least one line with a set of known and expected road marking features, and identifying a set of at least one first line in the at least one line as corresponding to a road feature in response to the at least the first line matching at least one of the set of known and expected road marking features, wherein comparing the at least one line with a set of known and expected road marking features includes identifying a set of at least one second line in the at least one line as corresponding to a trailer feature in response to every line in the set of at least one second line not matching the set of known and expected road marking features.

15. The camera mirror system of claim 14, wherein the at least one camera defines a class II and a class IV view.

16. The camera mirror system of claim 14, wherein the controller further includes a trailer feature detection module and wherein the trailer feature detection module is configured to determine a trailer angle at least partially based on a position of the at least one second line in the image.

17. The camera mirror system of claim 16, wherein the controller is further configured to pan a class II view presented to a vehicle operator based at least in part on the determined trailer angle such that the class II view includes at least a portion of a trailer end.

18. The camera mirror system of claim 14, wherein converting the region of interest from red-green-blue (RGB) to the single color using the controller comprises one of converting the region of interest to gray scale and extracting a green channel from the region of interest.

19. A process for identifying features in an image comprising:
receiving an image at a controller;
identifying a region of interest within the image and converting the region of interest from red-green-blue (RGB) to a single color using the controller;
detecting a set of edges within the region of interest, and identifying at least one line within the set of edges using the controller;
comparing the at least one line with a set of road marking features, and identifying a set of at least one first line in the at least one line as corresponding to a road feature in response to the at least the first line matching at least one of the set of road marking features; and
identifying a set of at least one second line in the at least one line as corresponding to a trailer feature in response to every line in the set of at least one second line not matching the set of road marking features.

* * * * *